United States Patent
Ogura

(10) Patent No.: US 11,227,152 B2
(45) Date of Patent: Jan. 18, 2022

(54) RECOGNITION APPARATUS, RECOGNITION METHOD, AND RECOGNITION PROGRAM

(71) Applicant: JVCKENWOOD CORPORATION, Yokohama (JP)

(72) Inventor: Takuya Ogura, Yokohama (JP)

(73) Assignee: JVCKENWOOD CORPORATION, Yokohama (JP)

(*) Notice: Subject to any disclaimer, the term of this patent is extended or adjusted under 35 U.S.C. 154(b) by 110 days.

(21) Appl. No.: 16/886,637

(22) Filed: May 28, 2020

(65) Prior Publication Data

US 2020/0293768 A1 Sep. 17, 2020

Related U.S. Application Data

(63) Continuation of application No. PCT/JP2019/014632, filed on Apr. 2, 2019.

(30) Foreign Application Priority Data

Apr. 20, 2018 (JP) .............................. JP2018-081071

(51) Int. Cl.
*G06K 9/00* (2006.01)
*G06T 7/73* (2017.01)

(52) U.S. Cl.
CPC ..... *G06K 9/00362* (2013.01); *G06K 9/00228* (2013.01); *G06K 9/00664* (2013.01); (Continued)

(58) Field of Classification Search
CPC ........... G06K 9/00362; G06K 9/00228; G06K 9/00664; G06T 7/74; G06T 2207/10048; G06T 2207/30201
(Continued)

(56) References Cited

U.S. PATENT DOCUMENTS 10,893,243 B1 * 1/2021 Trundle ............. G06K 9/00369
2007/0269079 A1 11/2007 Taniguchi et al.
(Continued)

FOREIGN PATENT DOCUMENTS

EP  2312550 A1  4/2011
JP  2003-219399 A  7/2003
(Continued)

OTHER PUBLICATIONS

Chari, S., et al., Classification of Humans and Animals Using an Infrared Profiling Sensor, Proceedings of SPIE, vol. 7333, May 1, 2009, pp. 1-9.
(Continued)

*Primary Examiner* — Mark Roz
(74) *Attorney, Agent, or Firm* — Procopio, Cory, Hargreaves & Savitch LLP

(57) ABSTRACT

A recognition apparatus includes an image acquisition unit configured to acquire an image captured by a far-infrared camera and a recognition processing unit configured to set a target region in the image and determine whether an object in the target region is a human being or an animal based on a temperature variation in the target region. A recognition apparatus, a recognition method, and a recognition program that can correctly determine whether it is a human being or an animal that appears in an image even when the human being or the animal appears in the image showing his/her or its front or back can be provided.

6 Claims, 5 Drawing Sheets

(52) U.S. Cl.
CPC ...... *G06T 7/74* (2017.01); *G06T 2207/10048* (2013.01); *G06T 2207/30201* (2013.01)

(58) Field of Classification Search
USPC ........................................................ 382/103
See application file for complete search history.

(56) References Cited

U.S. PATENT DOCUMENTS

2008/0130954 A1    6/2008   Taniguchi et al.
2014/0003670 A1    1/2014   Aimura

FOREIGN PATENT DOCUMENTS

JP       2007-310705 A     11/2007
JP       2010-020401 A     1/2010

OTHER PUBLICATIONS

Hossen, J., et al., Real Time Algorithms for Human Versus Animal Classifications using a Pyroelectric Sensor, Proceedings of SPIE, vol. 8711, Jun. 6, 2013, pp. 1-12.

\* cited by examiner

ANIMAL FULL-BODY IMAGE

HUMAN FULL-BODY IMAGE

RECOGNITION APPARATUS, RECOGNITION METHOD, AND RECOGNITION PROGRAM

CROSS REFERENCE TO RELATED APPLICATION

This application is a Bypass Continuation of PCT/JP2019/014632, filed on Apr. 2, 2019, which is based upon and claims the benefit of priority from Japanese patent application No. 2018-081071, filed on Apr. 20, 2018, the disclosure of which is incorporated herein in its entirety by reference.

BACKGROUND

The present invention relates to a recognition apparatus, a recognition method, and a recognition program.

A safety support apparatus that recognizes a situation surrounding a vehicle with the use of an image captured by an on-board camera and warns a driver is widely available. Such a safety support apparatus recognizes, with the use of a recognition dictionary or the like, an object in the vicinity of a host vehicle based on an image captured by a camera.

For example, Patent Literature 1 (Japanese Unexamined Patent Application Publication No. 2007-310705) describes a vehicle periphery monitoring apparatus. This vehicle periphery monitoring apparatus extracts an image region of an object from a captured image. When this region includes a first object region of which the ratio of the widths in different directions falls within a predetermined range and a plurality of second object regions located below the first object region and having an area smaller than that of the first object region, the vehicle periphery monitoring apparatus determines that the type of the object is an animal other than a human being.

The invention described in Patent Literature 1 determines, when an object is an animal other than a human being, that the object is an animal based on the characteristics (the sizes of the torso and the front and rear legs, the aspect ratio thereof, the positional relationship thereof, etc.) observed when the animal is facing sideways. Generally, when an animal appears in an image facing sideways, that is, when an animal appears in an image showing its side, the characteristics of the animal completely differ from the characteristics of a human being. Therefore, false detection between a human being and an animal rarely occurs.

However, when a human being or an animal appears in an image showing his/her or its front or back, the human being and the animal may show many similar characteristics, and thus false detection between a human being and an animal may occur.

SUMMARY

Accordingly, the embodiments provide a recognition apparatus that includes an image acquisition unit configured to acquire an image captured by a far-infrared camera and a recognition processing unit configured to set a target region in the image and determine whether an object in the target region is a human being or an animal based on a temperature variation in the target region.

Furthermore, the embodiments provide a recognition method that includes a step of acquiring an image captured by a far-infrared camera and a step of setting a target region in the image and determining whether an object in the target region is a human being or an animal based on a temperature variation in the target region.

The embodiments can provide a recognition apparatus, a recognition method, and a recognition program that, even when a human being or an animal appears in an image showing his/her or its front or back, correctly determines whether it is a human being or an animal that appears in the image.

DETAILED DESCRIPTION

Hereinafter, a recognition system and a recognition method according to some embodiments will be described with reference to the drawings.

The term "image" used in the present specification includes a still image and a moving image.

The term "animal" used in the present specification refers to any animal excluding a human being.

First Embodiment

A recognition system and a recognition method according to a first embodiment detects, with the use of a recognition dictionary, a human being or an animal in an image of a traveling direction and so on of a host vehicle captured by a far-infrared camera. When it cannot be determined clearly whether an object is a human being or an animal, whether the object is a human being or an animal is determined based on a temperature variation within a detection range at the time when the human being or the animal is detected.

First, a configuration of the recognition system according to the first embodiment will be described.

Figure 1:
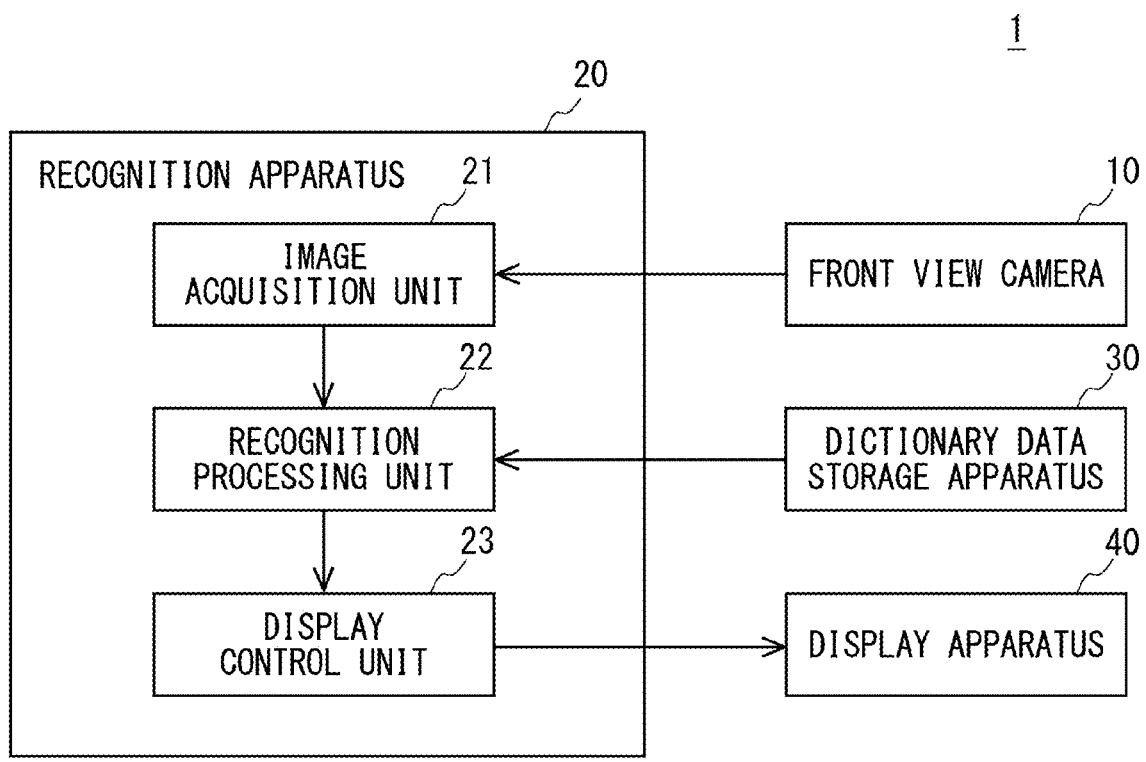
FIG. 1 is a block diagram illustrating a schematic configuration of a recognition system 1 according to a first embodiment.

FIG. 1 is a block diagram illustrating a schematic configuration of a recognition system 1 according to the first embodiment.

The recognition system 1 is, for example, a system to be mounted in a vehicle for use. The recognition system 1 includes a front view camera 10, a recognition apparatus 20, a dictionary data storage apparatus 30, and a display apparatus 40.

The recognition system 1 can be used as, aside from a system to be mounted in a vehicle for use, various systems, including a mobile terminal, a drone, and a robot, that are intended to recognize an object with the use of a far-infrared camera. In the following embodiment, a system to be mounted in a vehicle for use serves as an example.

The front view camera 10 captures an image of the traveling direction of the host vehicle and inputs the image into the recognition apparatus 20. The front view camera 10 is a far-infrared light camera but may also be a camera that uses another wavelength range. For example, the front view camera 10 may be a combination of a visible light camera and a far-infrared light camera.

The recognition apparatus 20 detects a human being and an animal with the use of an image captured by the front view camera 10 and outputs a warning signal to the display apparatus 40 and so on, if necessary. The recognition apparatus 20 detects a human being and an animal, for example, in every frame or every several frames of the image captured by the front view camera 10. To this end, the recognition apparatus 20 includes an image acquisition unit 21, a recognition processing unit 22, and a display control unit 23.

The image acquisition unit 21 receives an input of the image captured by the front view camera 10, performs various types of image processing on the image, and outputs a resulting image to the recognition processing unit 22.

The recognition processing unit 22 detects a human being or an animal in the received image with the use of a human recognition dictionary and an animal recognition dictionary stored in the dictionary data storage apparatus 30. In addition, the recognition processing unit 22 determines whether an object in a target region set in the received image is a human being or an animal based on a temperature variation within the region. Furthermore, the recognition processing unit 22, upon having determined whether the object is a human being or an animal, outputs a signal to the display control unit 23 so as to warn the driver, if necessary.

The display control unit 23 performs control for displaying a warning image on the display apparatus 40 or outputting a warning sound.

The dictionary data storage apparatus 30 stores various recognition dictionaries, including the human recognition dictionary and the animal recognition dictionary.

The human recognition dictionary includes a human full-body recognition dictionary, a human face recognition dictionary, and a human head recognition dictionary. Meanwhile, the animal recognition dictionary includes an animal full-body recognition dictionary, an animal face recognition dictionary, and an animal head recognition dictionary.

The human full-body recognition dictionary or the animal full-body recognition dictionary is created through machine learning of a full-body image in which a pedestrian or an animal appears showing his/her or its front or back and a full-body image in which the pedestrian or the animal shows his/her or its side, that is, a full-body image in which the pedestrian or the animal appears facing sideways.

Meanwhile, the human face recognition dictionary, the human head recognition dictionary, the animal face recognition dictionary, and the animal head recognition dictionary are created through machine learning of an image in which the face or the head of a human being or of an animal appears or an image of the face or head portion cut out from a full-body image of a human being or an animal.

When a human being or an animal is to be detected in an image, a detection range enclosing a detection target or a rectangular detection range including a detection target is identified with the use of edge detection processing or the like, and recognition processing is performed on this detection range.

Figure 2:
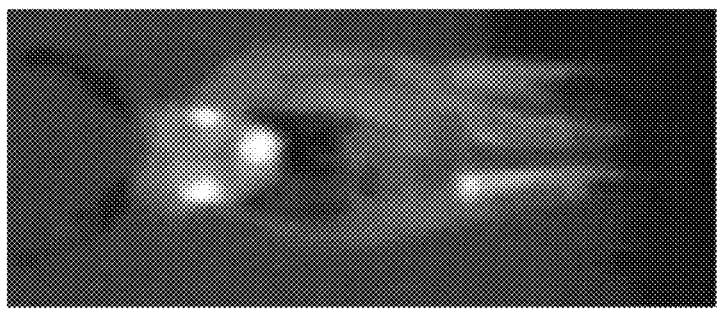
FIG. 2 illustrates examples of full-body images of a human being and of an animal according to the first embodiment.
Figure 2:
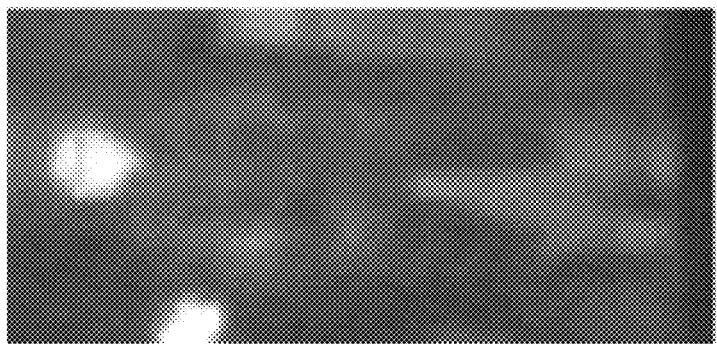

FIG. 2 illustrates examples of full-body images of a human being and of an animal according to the first embodiment. FIG. 2 illustrates, from the left, an image in which a human being appears showing his/her front and an image in which an animal appears showing its front. These images are monochrome gray scale images captured at night with the use of a far-infrared light camera and expressing a difference in the radiation amount (intensity) of infrared radiation in the form of a difference in luminance.

In the image of the human being, the face and hand portions where the skin is exposed and the thermal radiation is higher than that of the environment (background) have a higher luminance and result in white. A clothing portion where the thermal radiation is not much different from that of the environment has a medium luminance or a low luminance and results in gray or black. In other words, in the image of the human being, portions such as the head, the arms, and the legs where the skin is exposed have a higher luminance than a portion where the skin is not exposed.

In contrast, in the image of the animal, although there are some portions such as the eyes and the nose with a high luminance, the image as a whole has a medium luminance or a low luminance since almost the entire body is covered with fur.

A comparison between the image of the human being and the image of the animal reveals that a white region where the thermal radiation is high appears in a larger number or in a larger area in the image of the human being than in the image of the animal.

The display apparatus 40 warns the driver that a human being, an animal, or the like is present in the traveling direction of the host vehicle through an image, a sound, or the like.

A portion of the configuration of the recognition apparatus 20 may be replaced by another apparatus connected via communication means (not illustrated). For example, the recognition processing unit 22 and the dictionary data storage apparatus 30 may be replaced by another apparatus such as a recognition server connected via communication means.

Each component implemented by the recognition apparatus 20 can be implemented, for example, by a program executed under the control of an arithmetic device (not illustrated), or a computer, included in the recognition apparatus 20. To be more specific, the recognition apparatus 20 loads a program stored in a storage unit (not illustrated) onto a main storage device (not illustrated), and executes the program under the control of the arithmetic device.

Furthermore, each component is not limited to being implemented by software executed through a program and may instead be implemented by any combination of hardware, firmware, and software.

The above program can be stored and provided to the recognition apparatus 20 with the use of various types of non-transitory computer readable media. The non-transitory computer readable media include various types of tangible storage media.

Examples of the non-transitory computer readable media include magnetic storage media (e.g., a flexible disk, a magnetic tape, a hard disk drive), optical magnetic storage media (e.g., a magneto-optical disk), CD-ROM (Read Only Memory), CD-R, CD-R/W, and semiconductor memories (e.g., a mask ROM, a PROM (Programmable ROM), an EPROM (Erasable PROM), a flash ROM, a RAM (random access memory)).

Furthermore, the program may be provided to the recognition apparatus 20 with the use of various types of transitory computer readable media. Examples of the transitory computer readable media include an electric signal, an optical signal, and an electromagnetic wave. The transitory computer readable media can provide the program to the recognition apparatus 20 via a wired communication line, such as an electric wire or an optical fiber, or a wireless communication line.

Next, an operation of the recognition system 1 according to the first embodiment, that is, a recognition method, will be described.

Figure 3:
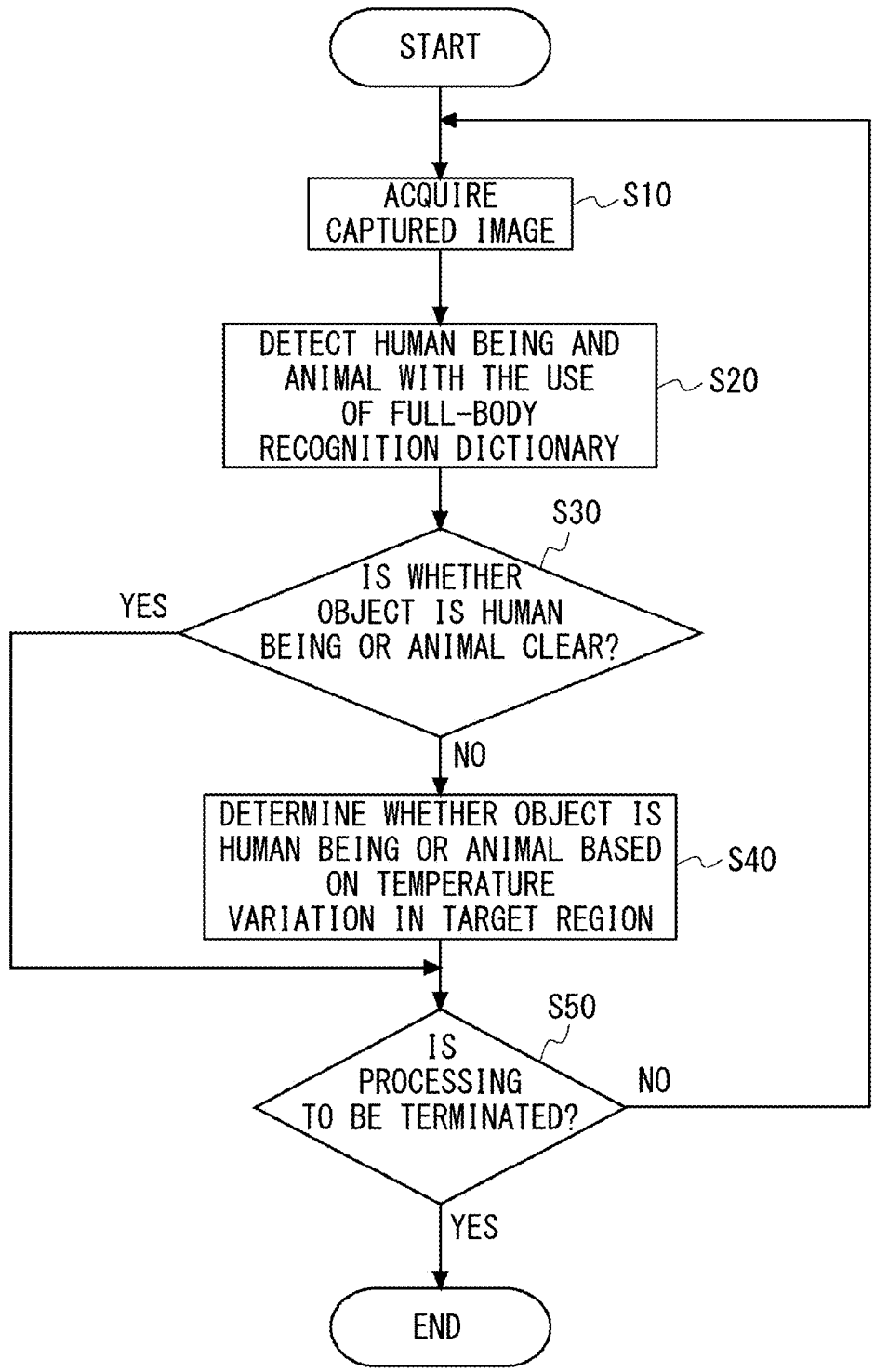
FIG. 3 is a flowchart illustrating a processing procedure of a recognition method according to the first embodiment.

FIG. 3 is a flowchart illustrating a processing procedure of the recognition method according to the first embodiment.

Upon the recognition system 1 starting to operate, the front view camera 10 captures an image of the traveling direction of the host vehicle, and the image acquisition unit 21 acquires the captured image as a recognition target image (step S10). The image acquisition unit 21 acquires the captured image that includes an image region where a human being or an animal appears, such as the ones illustrated in FIG. 2, for example.

Then, the recognition processing unit 22 defines the entire captured image or a portion of the captured image as a recognition target region and detects a human being and an animal with the use of the human full-body recognition dictionary and the animal full-body recognition dictionary stored in the dictionary data storage apparatus 30 (step S20). In step S20, the range for an object that can be a human being or an animal in the captured image is identified through edge detection processing or the like, for example.

Next, the recognition processing unit 22 determines whether the detection result in step S20 clearly indicates that the detected object is a human being or an animal (step S30).

The processing of step S30 makes a determination on a case in which the detection result in step S20 does not clearly indicate whether the object is a human being or an animal, as in a case in which, for example, the probability that the object is a human being is 40% according to the human full-body recognition dictionary and the probability that the object is an animal is 60% according to the animal full-body recognition dictionary.

A specific probability that serves as a reference for determining whether the detection result is clear may be set as desired. For example, when the probability that an object is one of a human being and an animal is 80% or higher and its difference from the probability that the object is the other one of a human being and an animal is 50% or higher, it may be clearly determined that the object is the one with a higher probability.

When the recognition processing unit 22 has detected clearly either a human being or an animal (YES in step S30), the flow proceeds to step S50. Then, the display control unit 23 warns the driver of the presence of the human being or the animal detected clearly in step S20.

Meanwhile, when the recognition processing unit 22 cannot recognize clearly whether the object is a human being or an animal (NO in step S30), the recognition processing unit 22 sets the range of this object as a target region and determines again whether the object is a human being or an animal based on a temperature variation within the region (step S40).

For example, the recognition processing unit 22 obtains, as the temperature variation within the target region, a lightness distribution indicated by pixels constituting a range that is recognized as a human being or an animal.

Then, the recognition processing unit 22 determines whether the object is a human being or an animal based on the detected temperature variation. The recognition processing unit 22 determines that the object is a human being when the temperature variation is greater than a predetermined value and determines that the object is an animal when the temperature variation is smaller than the predetermined value.

This is because, when an object is a human being, a large temperature difference is present between a skin portion and a clothing portion, and thus the temperature variation within the target region, for example, the standard deviation of the temperature is large; whereas, when an object is an animal, the entire body is covered with fur, and the overall temperature difference is small, and thus, the temperature variation within the target region is small, as described with reference to FIG. 2.

Specifically, an object is determined to be an animal because of a small temperature variation in the image captured by the far-infrared light camera in which, with regard to the lightness distribution indicated by the pixels constituting the range recognized as a human being or an animal, the gray range indicating a medium luminance is large and the white range indicating a high luminance is small. In contrast, an object is determined to be a human being because of a large temperature variation in the image in which the gray range indicating a medium luminance is large and the white range indicating a high luminance is also large.

It is of course possible that, depending on the time of the day, the season, the environment such as an indoor or outdoor environment, the image capturing condition, and so on, the temperature variation within a target region becomes small even when an object is a human being or the temperature variation within a target region becomes large even when an object is an animal. The correspondence relationship between the magnitude of the temperature variation within a target region and the determination result as to whether an object is a human being or an animal can be determined in accordance with the environment, the image capturing condition, and so on.

When the recognition processing unit 22 has detected an animal in step S40 while the probability that a human being is detected is higher than the probability that an animal is detected in step S20 but the recognition processing unit 22 cannot determine clearly that the object is a human being, the recognition processing unit 22 determines that the object detected in step S20 is an animal.

When the recognition processing unit 22 has detected a human being in step S40 while the probability that a human being is detected is higher than the probability that an animal is detected in step S20 but the recognition processing unit 22 cannot determine clearly that the object is a human being, the recognition processing unit 22 determines that the object detected in step S20 is a human being.

When the probability that an animal is detected is higher than the probability that a human being is detected in step S20 but the recognition processing unit 22 cannot determine clearly that the object is an animal, the recognition processing unit 22 may make a determination in a manner similar to the above.

When the recognition processing unit 22 has detected a human being or an animal, the display control unit 23 notifies, through the display apparatus 40, the driver that a pedestrian or an animal has been detected.

Next, the recognition apparatus 20 determines whether to terminate the recognition processing (step S50). When the recognition apparatus 20 has determined to terminate the recognition processing (YES in step S50), the processing is terminated. When the recognition apparatus 20 has determined not to terminate the recognition processing (NO in step S50), the flow returns to step S10, for example.

In this manner, the recognition system 1 or the recognition method according to the first embodiment detects, with the use of a recognition dictionary, a human being or an animal in an image captured by a far-infrared camera. When it cannot be determined clearly whether an object is a human being or an animal, whether the object is a human being or an animal is determined based on a temperature variation within a detection range at the time when the human being or the animal is detected. Therefore, a human being and an animal can be detected and distinguished therebetween with high accuracy.

It is to be noted that various additions, modifications, and changes can be made to the recognition system 1 and the recognition method according to the first embodiment.

For example, when the recognition processing unit 22 determines whether an object is a human being or an animal based on the temperature variation within the target region (step S40), in addition to calculating the temperature variation within the entire target region as described above or in place of calculating the temperature variation within the entire target region, the recognition processing unit 22 may extract an upper region and a lower region in the target region and calculate a temperature variation between the upper region and the lower region, for example, a difference in the mean temperature between the upper region and the lower region.

Figure 4:
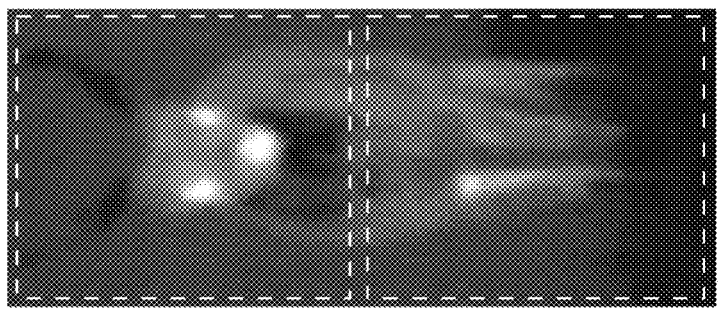
FIG. 4 is an illustration for describing a method of extracting an upper region and a lower region according to the first embodiment.
Figure 4:
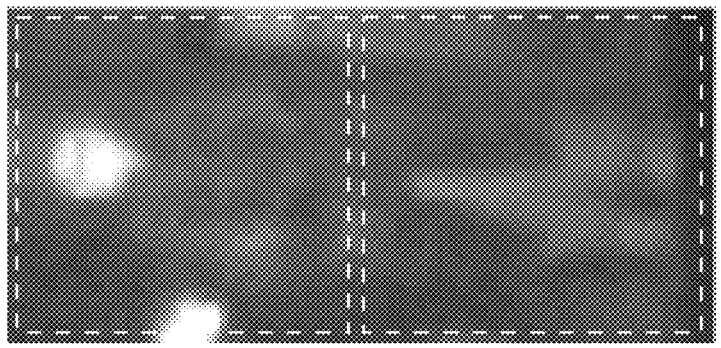

FIG. 4 is an illustration for describing a method of extracting an upper region and a lower region according to the first embodiment. The extracted upper region and lower region are indicated by the respective dashed enclosures in each of the captured image. Of course, the method of extracting the upper region and the lower region is not limited to the illustrated one. The upper region and the lower region may be spaced apart from each other, or the upper region or the lower region may be spaced apart from the edges of the captured image.

Although the upper region and the lower region are each a rectangular enclosure in FIG. 4, with a region enclosed by a boundary between a range where an animal or a human being is detected and the background serving as a target region, an upper portion and a lower portion of that target region may serve as the upper region and the lower region, respectively.

In an image of a human being, an upper region where the face appears has a larger white area, and a lower region where the clothing appears has a larger gray or black area. Meanwhile, in an image of an animal, no large difference in color is observed between an upper region and a lower region.

Accordingly, the recognition processing unit 22 detects a human being if the temperature difference between the upper region and the lower region is greater than a predetermined value and detects an animal when the temperature difference between the upper region and the lower region is smaller than the predetermined value.

In place of extracting an upper region and a lower region from a target region, the recognition processing unit 22 may extract an upper region, a middle region, and a lower region from a target region and calculate a temperature variation between the upper region and the middle region. The method of extracting the upper region, the middle region, and the lower region can be set as desired, including a method in which the target region is equally divided into three.

With regard to another determination method that is based on a temperature variation, the recognition processing unit 22 may employ a method of determining whether an object is a human being or an animal based on the area of a portion constituted mainly by white pixels indicating a high luminance. For example, in the images illustrated in FIG. 2, the ranges where the white pixels indicating a high luminance are concentrated are portions corresponding to the eyes, the nose, and so on in the image of the animal and portions corresponding to the face, the arms, the hands, and so on in the image of the human being.

Therefore, the area of the range where the white pixels are concentrated is small in the image of the animal and is large in the image of the human being in the target region where the object is recognized as the human being or the animal. Accordingly, it is possible to determine whether an object is a human being or an animal by determining whether the proportion of the area of the range where the white pixels are concentrated relative to the target region where the object is recognized as the human being or the animal is no lower than a predetermined threshold or lower than the predetermined threshold.

When the recognition processing unit 22 determines whether an object is a human being or an animal based on the temperature variation within the target region (step S40), the recognition processing unit 22 may detect the face or the head of the human being or of the animal from the image within the target region with the use of the human face recognition dictionary, the human head recognition dictionary, the animal face recognition dictionary, or the animal head recognition dictionary and calculate the temperature variation between the face or head region and a region other than the face or the head.

In this case, in step S40, the recognition processing unit 22 detects a human being if the temperature difference between the face or head region and the region other than the face or head region is greater than a predetermined value and detects an animal when the temperature difference between the face or head region and the region other than the face or head region is smaller than the predetermined value.

The recognition processing unit 22 may omit the process (step S30) of determining the next procedure upon having determined whether it is clear that the object detected in step S20 is a human being or an animal, and the recognition processing unit 22 may mandatorily perform the process (step S40) of detecting a human being or an animal based on the temperature variation within the target region after the process (step S20) of detecting a human being and an animal from the captured image with the use of a recognition dictionary.

Then, when determining whether the object is a human being or an animal in step S40, the recognition processing unit 22 may make a determination upon giving a certain weight on the detection result of step S20.

Furthermore, when the recognition processing unit 22 has detected a human being or an animal (step S20, step S40), the recognition processing unit 22 may calculate the distance from the host vehicle to the human being or the animal or the size of the human being or the animal based on the position or the size of the target region or a detection frame enclosing the target region in the image and notify the driver.

When the distance to the human being or the animal is calculated based on the size of the target region or the detection frame enclosing the target region, for example, the distance is calculated with an assumption that the height of the human being is 1.7 m and the body length of the animal is 1.0 m. This leads to a difference of 170% in the calculated distance between when a human being is detected and when an animal is detected within the same detection frame. Accordingly, by accurately distinguishing between a human being and an animal with the recognition system 1 according to the first embodiment, the distance to the detected human being, animal, or the like can be calculated with higher accuracy.

The display control unit 23 may change the method in which the display control unit 23 notifies the driver between when a human being, such as a pedestrian, is detected and when an animal is detected. For example, animals may be present in groups or an animal may take an unpredictable action, such as running into a road. Therefore, when an animal is detected, the display control unit 23 may provide an early notification to the driver.

The configuration of the recognition system 1 is not limited to the one described above. A plurality of apparatuses, such as the recognition apparatus 20 and the dictionary data storage apparatus 30, may be integrated into a unit to serve as a recognition apparatus provided with a dictionary data storage unit. In addition, all the components of the recognition system 1 may be integrated into a unit to serve as a recognition apparatus provided with a front view camera, a dictionary data storage unit, and a display unit. Of course, the recognition system 1 may be configured as a human recognition system, an animal recognition system, a human and animal distinguishing system, or the like.

With regard to the use in vehicles, in addition to a mode in which the part of the whole of the recognition system 1 is mounted in a vehicle, a mode in which the recognition system 1 is portably mounted or is custom installable may also be employed.

Aside from being installed in a vehicle, the recognition system 1 may be installed, for example, in a building, and a camera may be provided in front of an automatic door or the like to determine whether to open or close the automatic door. In this case, in one possible determination, the automatic door is opened only when the object is determined to be a human being, and the automatic door is closed when the object is determined to be an animal.

In place of performing image recognition with the use of a dictionary created through machine learning of an image of a human being, an animal, or the like, or in addition to performing image recognition with the use of a dictionary created through machine learning, the recognition processing unit 22 may perform different image recognition, such as pattern matching with the use of a template of a human being, an animal, or the like, for example.

As described thus far, the recognition apparatus 20 according to the first embodiment includes the image acquisition unit 21 that acquires an image captured by the far-infrared camera 10 and the recognition processing unit 22 that sets a target region in the image and determines whether an object in the target region is a human being or an animal based on the temperature variation in the target region.

In the recognition apparatus 20 according to the first embodiment, the recognition processing unit 22 can detect a human being or an animal in the image with the use of the human full-body recognition dictionary and the animal full-body recognition dictionary. When the recognition processing unit 22 cannot determine whether the object is a human being or an animal, the recognition processing unit 22 can set a detection range at the time when a human being or an animal is detected as the target region and determine whether the object in the target region is a human being or an animal based on the temperature variation in the target region.

Furthermore, in the recognition apparatus 20 according to the first embodiment, the recognition processing unit 22 can use a temperature difference between an upper portion and a middle portion in the target region as the temperature variation in the target region.

In addition, in the recognition apparatus 20 according to the first embodiment, the recognition processing unit 22 can detect the face or the head in the target region with the use of a face recognition dictionary or a head recognition dictionary and use a temperature difference between the face or head region and a region other than the face or the head in the target region as the temperature variation in the target region.

Furthermore, in the recognition apparatus 20 according to the first embodiment, the recognition processing unit 22 can use the area of a region where the temperature is high in the target region as the temperature variation in the target region.

The recognition method according to the first embodiment includes step S10 of acquiring an image captured by a far-infrared camera and step S40 of setting a target region in the image and determining whether an object in the target region is a human being or an animal based on a temperature variation in the target region.

Second Embodiment

The recognition system 1 and the recognition method according to the first embodiment detect, with the use of a recognition dictionary, a human being or an animal in an image captured by the far-infrared camera 10. When it cannot be determined clearly whether an object is a human being or an animal, whether the object is a human being or an animal is determined based on a temperature variation within a target region.

In contrast, a recognition system and a recognition method according to a second embodiment set a target region in an image captured by a far-infrared camera, determine whether an object is a human being or an animal based on a temperature variation within the target region, and again detect, based on the determination result, a human being or an animal in the image of the target region with the use of a recognition dictionary.

An overall configuration of the recognition system according to the second embodiment is similar to the overall configuration of the recognition system 1 according to the first embodiment, and thus illustration and detailed descriptions thereof will be omitted here. In the following, to simplify the description, the reference characters of the components in the recognition system 1 according to the first embodiment are used as-is as the reference characters of the corresponding components in the recognition system according to the second embodiment.

An operation of the recognition system 1 according to the second embodiment, that is, a recognition method, will be described.

Figure 5:
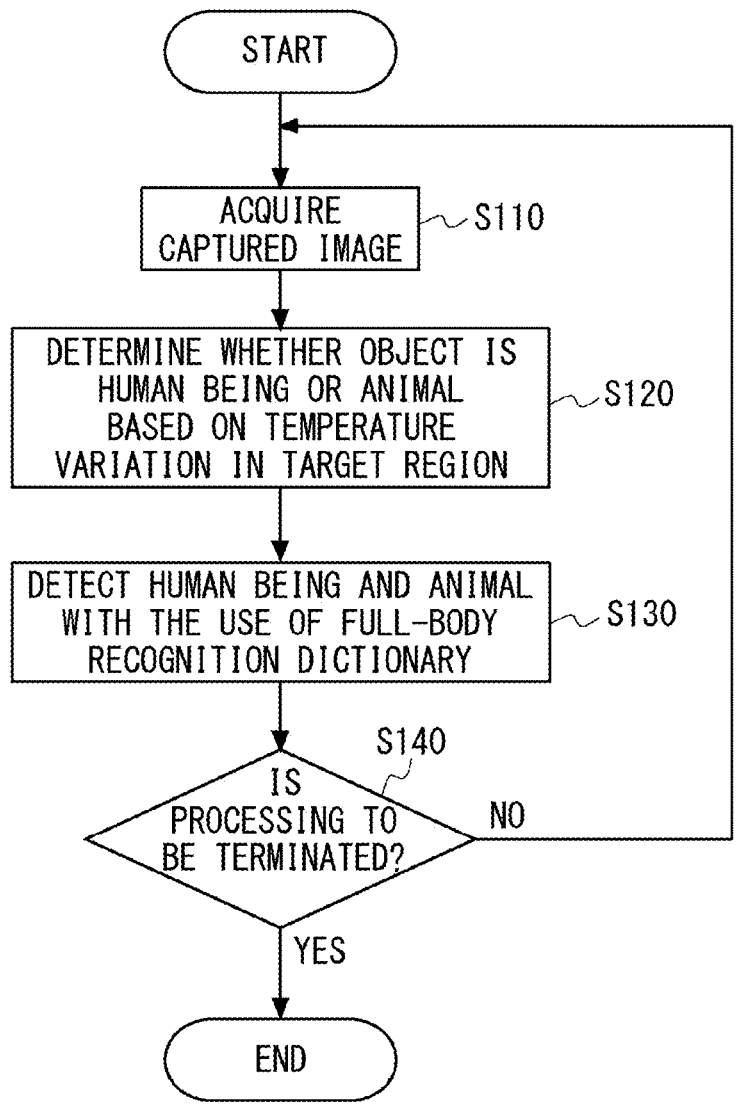
FIG. 5 is a flowchart illustrating a processing procedure of a recognition method according to a second embodiment.

FIG. 5 is a flowchart illustrating a processing procedure of the recognition method according to the second embodiment.

Upon the recognition system 1 starting to operate, the front view camera 10 captures an image of the traveling direction of the host vehicle, and the image acquisition unit 21 acquires the captured image as a recognition target image (step S110).

Then, the recognition processing unit 22 sets a region that includes a portion where the temperature is high in the captured image as a target region and determines whether an object in the target region is a human being or an animal based on a temperature variation in the target region (step S120).

The recognition processing unit 22 can set a region with a predetermined size centered on a portion where the temperature is high in the captured image as the target region or can scan a region with a predetermined size in the captured image and set a portion where the mean temperature is high in that region as the target region, for example. In this manner, any method may be employed to set the target region, or a plurality of target regions may be set.

The determination method through which the recognition processing unit 22 determines whether an object is a human being or an animal based on the temperature variation in the target region may be similar to the determination method according to the first embodiment.

The determination in step S120 is made before detection is performed with the use of a recognition dictionary, and thus there may be a case in which whether an object is a human being or an animal cannot be confirmed. Accordingly, the recognition processing unit 22 determines whether an object is a human being or an animal in step S120, and then the flow proceeds to step S130.

Then, the recognition processing unit 22 again detects a human being and an animal in the target region with the use of the human full-body recognition dictionary and the animal full-body recognition dictionary stored in the dictionary data storage apparatus 30 (step S130). The detection method employed in this case may be similar to the detection method according to the first embodiment.

In this manner, the recognition processing unit 22 determines clearly whether what is detected in step S120 is a human being or an animal based on the detection results in step S120 and step S130.

When the recognition processing unit 22 has detected a human being or an animal, the display control unit 23 notifies the driver that a pedestrian or an animal has been detected via the display apparatus 40.

Next, the recognition apparatus 20 determines whether to terminate the recognition method (step S140). When the recognition apparatus 20 has determined to terminate the recognition method (YES in step S140), the processing is terminated. When the recognition apparatus 20 has determined not to terminate the recognition method (NO in step S140), the flow returns to step S110, for example.

In this manner, the recognition system 1 or the recognition method according to the second embodiment sets a target region in an image captured by a far-infrared camera, detects a human being or an animal based on a temperature variation within the target region, and again detects a human being or an animal in the image of the target region with the use of a recognition dictionary. Thus, a human being and an animal can be detected and distinguished therebetween with high accuracy.

It is to be noted that various additions, modifications, and changes can be made to the recognition system 1 or the recognition method according to the second embodiment as well.

For example, when the recognition processing unit 22 has determined that the object is a human being in step S120, the recognition processing unit 22 may detect the human being with the use of only the human full-body recognition dictionary in step S130. When the recognition processing unit 22 has determined that the object is an animal in step S120, the recognition processing unit 22 may detect the animal with the use of only the animal full-body recognition dictionary in step S130.

In this manner, if only an optimal recognition dictionary is used, the processing load can be reduced as compared to a case where a plurality of recognition dictionaries are used, and false detection between a human and an animal can be reduced.

When the recognition processing unit 22 has determined that the object is either a human being or an animal in step S120, a process of determining whether the determination result that is based on the temperature variation is clear may be added. For example, when the determination result that is based on the process (step S120) of determining whether the objects is a human being or an animal based on the temperature variation within the target region clearly indicates that the objects is a human being or an animal, the flow may proceed to step S140. When the determination result is not clear, the process (step S130) of detecting a human being or an animal in the target region with the use of a recognition dictionary may be performed.

As described thus far, in the recognition apparatus 20 according to the second embodiment, the recognition processing unit 22 can set a region where the temperature is high in a captured image as a target region, determine whether an object is a human being or an animal based on a temperature variation, and detect, when it is not determined clearly whether the object is a human being or an animal, a human being or an animal in the target region with the use of the human full-body recognition dictionary and the animal full-body recognition dictionary.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present disclosure can be used to recognize an environment surrounding a moving object.

What is claimed is:

1. A recognition apparatus comprising:
   an image acquisition unit configured to acquire an image captured by a far-infrared camera; and
   a recognition processing unit configured to
      detect an object in the captured frame,
      determine whether the object is a human being or an animal with the use of a human full-body recognition dictionary and an animal full-body recognition dictionary,
      when it cannot be determined whether the object is a human being or an animal using the human full-body recognition dictionary and the animal full-body recognition dictionary, set a detection range at the time when the object is detected as the target region, and
      determine whether the object in the target region is a human being or an animal based on a temperature variation in the target region.

2. The recognition apparatus according to claim 1, wherein the recognition processing unit uses a temperature difference between an upper portion and a middle portion in the target region as the temperature difference in the target region.

3. The recognition apparatus according to claim 1, wherein the recognition processing unit detects a face or a head in the target region with the use of a face recognition dictionary or a head recognition dictionary, and uses a temperature difference between the face or the head in the target region and a region other than the face or the head in the target region as the temperature variation in the target region.

4. The recognition apparatus according to claim 1, wherein the recognition processing unit uses the size of an area of a region where a temperature is high in the target region as the temperature variation in the target region.

5. A recognition method executed by a recognition apparatus, the recognition method comprising:

a step of acquiring an image captured by a far-infrared camera;

a step of detecting an object in the captured frame;

a step of determining whether the object is a human being or an animal with the use of a human full-body recognition dictionary and an animal full-body recognition dictionary;

when it cannot be determined whether an object is the human being or the animal using the human full-body recognition dictionary and the animal full-body recognition dictionary, a step of setting a detection range at the time when the object is detected as the target region; and a step of determining whether the object in the target region is a human being or an animal based on a temperature variation in the target region.

6. A non-transitory computer readable medium storing a recognition program causing a computer to execute:

a procedure of acquiring an image captured by a far-infrared camera;

a procedure of detecting an object in the captured frame;

a procedure of determining whether the object is a human being or an animal with the use of a human full-body recognition dictionary and an animal full-body recognition dictionary;

when it cannot be determined whether the object is a human being or an animal using the human full-body recognition dictionary and the animal full-body recognition dictionary, a procedure of setting a detection range at the time when the object is detected as the target region; and a procedure of determining whether the object in the target region is a human being or an animal based on a temperature variation in the target region.

* * * * *